(12) United States Patent
Islam (10) Patent No.: US 11,679,728 B2
(45) Date of Patent: Jun. 20, 2023

(54) SYSTEM AND METHOD FOR CONTROLLING VEHICLE SYSTEMS

(71) Applicant: JAGUAR LAND ROVER LIMITED, Coventry (GB)

(72) Inventor: Zakirul Islam, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 452 days.

(21) Appl. No.: 16/980,984

(22) PCT Filed: Feb. 8, 2019

(86) PCT No.: PCT/EP2019/053164
§ 371 (c)(1),
(2) Date: Sep. 15, 2020

(87) PCT Pub. No.: WO2019/174832
PCT Pub. Date: Sep. 19, 2019

(65) Prior Publication Data
US 2021/0086709 A1 Mar. 25, 2021

(30) Foreign Application Priority Data
Mar. 15, 2018 (GB) ...................................... 1804175

(51) Int. Cl.
*B60R 16/02* (2006.01)
*B60R 16/023* (2006.01)

(52) U.S. Cl.
CPC ................................ *B60R 16/0231* (2013.01)

(58) Field of Classification Search
CPC .............. B60R 16/0231; B60W 50/10; B60W 50/0098; B60W 10/30; B60W 2556/50; B60W 2555/20; B60W 2540/215
See application file for complete search history.

(56) References Cited

U.S. PATENT DOCUMENTS

| 9,919,646 | B1* | 3/2018 | Arnold | G08B 21/24 |
| 2008/0156553 | A1* | 7/2008 | Hoogenraad | B60W 20/00 |
| | | | | 701/99 |

(Continued)

FOREIGN PATENT DOCUMENTS

| GB | 2515901 A | 1/2015 |
| WO | 2013055487 A1 | 4/2013 |

OTHER PUBLICATIONS

Combined Search and Examination Report, GB1804175.6, dated Jan. 23, 2019, 5 pages.

(Continued)

*Primary Examiner* — Behrang Badii
(74) *Attorney, Agent, or Firm* — McCoy Russell LLP (57) ABSTRACT

A controller (200) for controlling a vehicle system (210), the controller comprising: an input (206) for receiving a configuration signal specifying an action to be carried out by a vehicle system in response to a trigger condition, the trigger condition being associated with a start condition; a memory module (204) arranged to store data indicative of the specified action and trigger condition, the memory module being further arranged to store data indicative of a default action to be carried out by the vehicle system in response to a default action trigger condition; a processor (202) arranged, upon the start condition being met to generate a control signal for controlling the vehicle system in accordance with the stored action; an output (208) arranged to output the control signal; wherein the processor is arranged to determine when, subsequent to the start condition being met, a default action trigger condition is met and to generate a further control signal for controlling the vehicle system in accordance with the stored default action.

20 Claims, 4 Drawing Sheets

(56) References Cited

U.S. PATENT DOCUMENTS

| | | |
|---|---|---|
| 2014/0009468 A2 | 1/2014 | Mueller |
| 2014/0277878 A1 | 9/2014 | Manickaraj et al. |
| 2017/0122239 A1* | 5/2017 | Li .................. F02D 41/062 |
| 2017/0298849 A1 | 10/2017 | Be et al. |
| 2018/0204178 A1 | 7/2018 | Arshad et al. |
| 2019/0203828 A1* | 7/2019 | Moorman ........... F16H 63/3483 |

OTHER PUBLICATIONS

International Search Report and Written Opinion, PCT/EP2019053164, dated Jun. 24, 2019, 11 pages.

\* cited by examiner

SYSTEM AND METHOD FOR CONTROLLING VEHICLE SYSTEMS

CROSS-REFERENCE TO RELATED APPLICATIONS

This application is a 371 of International Application No. PCT/EP2019/053164, filed Feb. 8, 2019, which claims priority to GB Patent Application 1804175.6, filed Mar. 15, 2018, the contents of both of which are incorporated by reference herein in their entirety.

TECHNICAL FIELD

The present disclosure relates to a system and method for controlling vehicle systems and particularly, but not exclusively, to a controlling a vehicle system in accordance with a trigger condition. Aspects of the invention relate to a controller, to a vehicle and to a method.

BACKGROUND

During use of a vehicle, a driver often wishes to perform various secondary tasks related to the control of various vehicle systems in addition to the primary task of driving the vehicle. Frequently performed secondary tasks include, for example, pairing a phone with the vehicle, playing a particular music source, engaging a particular driving mode, and controlling the heating and air conditioning system, as well as turning on and/or adjusting many other vehicle systems. Performing these secondary tasks generally requires the driver or a passenger to manually control each of the desired secondary systems, which can be time consuming and inconvenient.

In addition, a driver often knows before commencing a drive which vehicle systems they are likely to use, and which settings they are likely to select. However, drivers typically have to wait until they have entered their car at the start of a drive to activate the desired vehicle systems and engage the desired settings.

In known vehicle configurations it is possible to program the vehicle to perform certain actions when a given trigger condition is satisfied. For example a vehicle system may be activated as a vehicle enters a given location and deactivated as it leaves the location.

However, in the case of overlapping locations the vehicle may not behave in the manner that was intended by the driver, for example the vehicle may not revert to the state intended when it leaves a trigger location.

It is an aim of the present invention to address disadvantages associated with the prior art.

SUMMARY OF THE INVENTION

According to an aspect of the present invention there is provided a controller for controlling a vehicle system, the controller comprising: an input for receiving a configuration signal specifying an action to be carried out by a vehicle system in response to a trigger condition, the trigger condition being associated with a start condition; a memory module arranged to store data indicative of the specified action and trigger condition, the memory module being further arranged to store data indicative of a default action to be carried out by the vehicle system in response to a default action trigger condition; a processor arranged, upon the start condition being met to generate a control signal for controlling the vehicle system in accordance with the stored action; an output arranged to output the control signal; wherein the processor is arranged to determine when, subsequent to the start condition being met, a default action trigger condition is met and to generate a further control signal for controlling the vehicle system in accordance with the stored default action.

The present invention provides a controller for controlling a vehicle system in which an action/trigger event is defined along with a default action and default trigger condition. User requested actions and/or the default action are processed as the vehicle satisfies the appropriate trigger condition. In this manner the need to define exit conditions is removed thereby improving the performance of the controller compared to prior art systems.

The trigger condition may be selected from one of more of: vehicle location; time; temperature; and humidity.

The trigger condition may define a geofenced location and the start condition may define entry into the defined location. The default action trigger condition may define a default area outside the defined geofenced location.

The memory module may be arranged to store data indicative of a plurality of overlapping geofenced areas, each geofenced area being associated with the same specified action, wherein the processor may be arranged upon entry into one of the plurality of geofenced areas to generate a control signal for controlling the vehicle system in accordance with the stored action and to generate a control signal for controlling the vehicle system in accordance with the default action as the vehicle enters into the defined default area.

The memory module may be arranged to store data defining a plurality of overlapping geofenced areas, each geofenced area being associated with the same specified action, wherein the processor may be arranged to merge the overlapping geofenced areas into a single geofenced zone and wherein upon entry into the geofenced zone the processor may be arranged to generate a control signal for controlling the vehicle system in accordance with the stored action and to generate a control signal for controlling the vehicle system in accordance with the default action as the vehicle enters into the defined default area.

The processor may be arranged upon receiving the configuration signal from the user to set a default action and default action trigger condition. Alternatively, the processor may be arranged upon receiving the configuration signal from the user to prompt the user to set a default action and default action trigger condition.

The trigger condition may comprise a temperature threshold value or temperature range. In one arrangement, the start condition may define exceeding a threshold temperature value. In other arrangements, the start condition may define falling below a threshold temperature value or may define entering a defined temperature range.

The memory module may be arranged to store data indicative of overlapping temperature ranges relating to in-vehicle and/or external temperature values.

The trigger condition may comprise a humidity threshold value or humidity range. In one arrangement, the start condition may define exceeding a threshold humidity value. In other arrangements, the start condition may define falling below a threshold humidity value or may define entering a defined humidity range.

The memory module may be arranged to store data indicative of overlapping humidity ranges relating to in-vehicle and/or external humidity values.

The trigger condition may comprise a time value and the start condition may define a time period such as weekday or weekend, a particular day of the week, a time of day or a length of driving period. The memory module may be arranged to store data indicative of overlapping time periods.

The memory module may be arranged to store data indicative of a specified action to be carried out by vehicle systems relating to at least one of: EV charging system, navigation, comfort, entertainment, interior configuration, security, vehicle cameras, side mirror control, tow-bar deployment/retraction, Advanced Driver Assistance Systems (ADAS) and/or telephone/media features.

In more detail, specified actions may comprise selecting different media or comfort settings on weekly commutes than at weekends. Additionally, certain features may be enabled after the user has been driving after a given time period, e.g. the navigation system may display rest stops after 2 hours of driving.

The invention extends to a vehicle comprising the controller in accordance with the above aspect of the present invention.

According to an aspect of the present invention there is provided a method of controlling a vehicle system, the method comprising: receiving a configuration signal specifying an action to be carried out by a vehicle system in response to a trigger condition, the trigger condition being associated with a start condition; storing in a memory module data indicative of the specified action and trigger condition, the memory module being further arranged to store data indicative of a default action to be carried out by the vehicle system in response to a default action trigger condition; generating, upon the start condition being met, a control signal for controlling the vehicle system in accordance with the stored action; outputting the control signal; and determining when, subsequent to the start condition being met, a default action trigger condition is met and generating a further control signal for controlling the vehicle system in accordance with the stored default action.

Optionally, the trigger condition is selected from one of more of: vehicle location; time; humidity and temperature.

In embodiments, the trigger condition defines a geofenced location and the start condition defines entry into the defined location. The default action trigger condition may define a default area outside the defined geofenced location. In embodiments, the method may comprise storing in the memory module data indicative of a plurality of overlapping geofenced areas, each geofenced area being associated with the same specified action, generating a control signal for controlling the vehicle system in accordance with the stored action upon entry into one of the plurality of geofenced areas, and generating a control signal for controlling the vehicle system in accordance with the default action upon entry into the default area. Alternatively, the method may comprise storing in the memory module data indicative of a plurality of overlapping geofenced areas, each geofenced area being associated with the same specified action, merging the overlapping geofenced areas into a single geofenced zone, generating a control signal for controlling the vehicle system in accordance with the stored action upon entry into the geofenced, and generating a control signal for controlling the vehicle system in accordance with the default action as the vehicle enters into the defined default area.

Optionally, the method comprises setting a default action and default action trigger condition upon receiving the configuration signal.

In embodiments, the method comprises prompting a user to set a default action and default action trigger condition upon receiving the configuration signal.

Optionally, the trigger condition may comprise a temperature value and the start condition defines one of: exceeding a threshold temperature value; falling below a threshold temperature value; entering a temperature range. In embodiments, the method may comprises storing in the memory module data indicative of overlapping temperature ranges relating to in-vehicle and/or external temperature values.

Optionally, the trigger condition may comprise a humidity value and the start condition defines one of: exceeding a threshold humidity value; falling below a threshold humidity value; entering a humidity range. In embodiments, the method may comprises storing in the memory module data indicative of overlapping humidity ranges relating to in-vehicle and/or external humidity values.

In embodiments, the trigger condition comprises a time value and the start condition defines one of: a weekday; a weekend; a time of day; a length of driving period. Optionally, the method comprises storing data indicative of overlapping time periods in the memory module.

In embodiments, the method may comprise storing in the memory module data indicative of a specified action to be carried out by vehicle systems relating to at least one of: EV charging system, navigation, comfort, entertainment, interior configuration, security, vehicle cameras, side mirror control, tow-bar deployment/retraction, Advanced Driver Assistance Systems (ADAS) and/or telephone/media features.

The invention extends to a computer program product comprising instructions which, when the program is executed by a computer, cause the computer to carry out the above method and to a computer-readable storage medium comprising instructions which, when executed by a computer, cause the computer to carry out the above method.

A system comprising a controller as described above, wherein the input for receiving a configuration signal comprises an electronic processor having an electrical input for receiving said one or more signals and the processor is configured to access the memory module and execute instructions stored therein such that it is operable to generate a control signal for controlling the vehicle system based on a start condition of a trigger condition being met.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the purposes of this disclosure, it is to be understood that the controller described herein can comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "controller" will be understood to include both a single control unit or controller and a plurality of control units or controllers collectively operating to provide the required control functionality. The term "module" is likewise intended to include either a single computational module performing a single or multiple functions or a plurality of computational modules performing separable functions. A set of instructions could be provided which, when executed, cause said controller(s) or control unit(s) or module(s) to implement the control techniques described herein (including the method(s) described herein). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g. a non-transitory storage medium) that may comprise any mechanism for storing information in a form readable by a machine or electronic processors/computational device, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM and EEPROM); flash memory; or electrical or other types of medium for storing such information/instructions.

BRIEF DESCRIPTION OF THE DRAWINGS

One or more embodiments of the invention will now be described, by way of example only, with reference to the accompanying drawings, in which.

DETAILED DESCRIPTION

In known vehicle configurations it is possible to program the vehicle to perform certain actions when a given trigger condition is satisfied. For example, as shown in FIG. 1, a vehicle system may be activated as a vehicle enters a given location and deactivated as it leaves the location.

Figure 1:
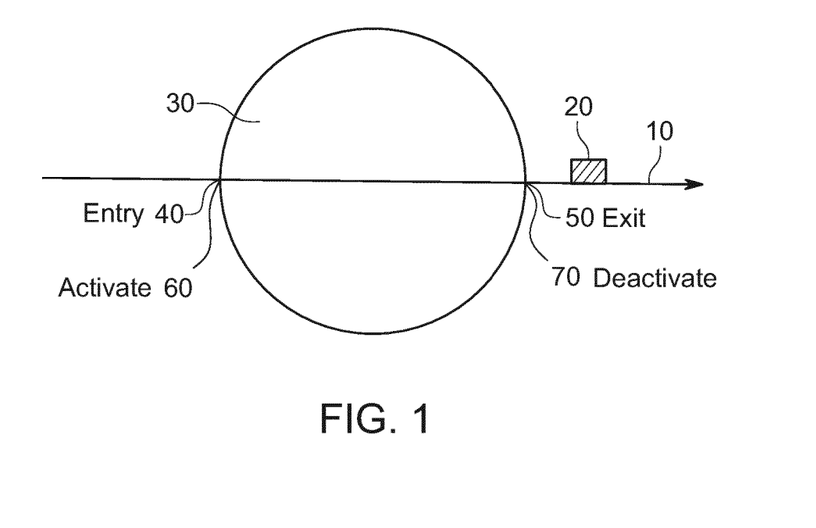
FIG. 1 is a representation of a known action/trigger event.

FIG. 1 shows a representation of a known method of scheduling actions in response to trigger events. FIG. 1 shows the direction of travel 10 of a vehicle 20. A location 30 has been defined along with an entry point 40 and an exit point 50. As the vehicle passes through the entry point 40 (and enters the location 30) a vehicle system is activated 60. As the vehicle passes through the exit point 50 (as it leaves the location 30) the vehicle system is deactivated 70.

The setting of the location 30 and the action to be taken by the vehicle user in a configuration phase. It is noted that the method illustrated in FIG. 1 requires the vehicle user to set two rules, one to cover entry to the location 30 and one to cover exiting the location 30.

Figure 2:
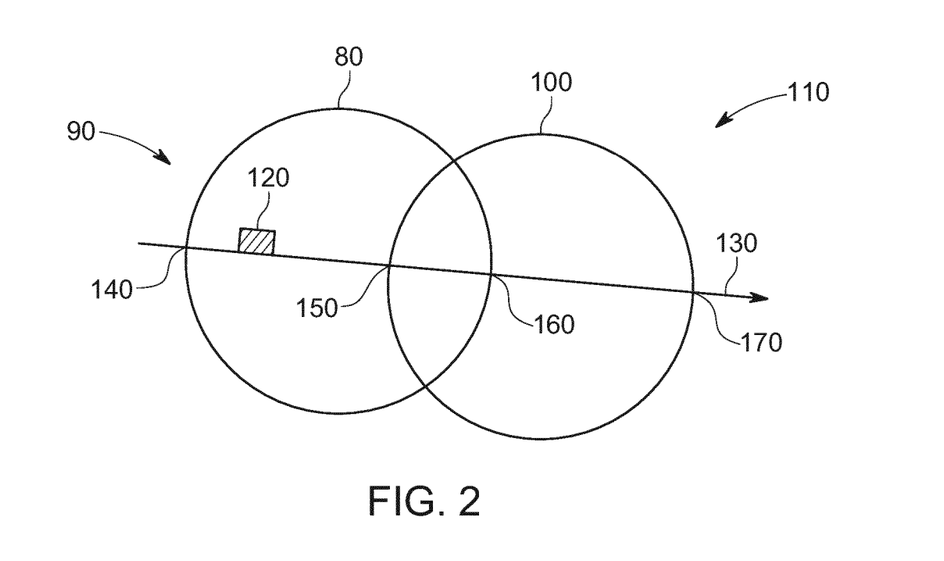
FIG. 2 is a representation of a known overlapping pair of action/trigger events.

Although such programmable features provide a mechanism for a driver to control operation of the vehicle issues may arise in the event of overlapping trigger conditions. For example, as shown in FIG. 2, two action/trigger events are shown. Each event relates to the activation and deactivation of the same vehicle system as the vehicle passes through a given location (location 80 for action/trigger event 90 and location 100 for action/trigger event 110 where locations 80 and 100 overlap).

It is noted that a vehicle 120 following the path indicated (path 130) will enter the first location at entry point 140 thereby triggering the activation of the vehicle system. As the vehicle reaches entry point 150 (which corresponds to the entry point of the second action/trigger event 110) the vehicle system is already in its activated mode. There is therefore no change in the vehicle system at this point.

However, as the vehicle reaches exit point 160 (which corresponds to the exit point of the first action/trigger event 90) the vehicle system is deactivated even though the vehicle is still within the second location 100.

The vehicle therefore traverses the remainder of the second location 100 with the vehicle system in its deactivated state instead of its activated state. When the vehicle passes through the second exit point 170 (which corresponds to the exit point of the second location 100) there is no action taken on the vehicle system.

It can therefore be seen that the overlapping entry/exit points of the two locations have caused the vehicle to behave in a manner that was not intended by the driver.

It is also noted that for a series of overlapping action/trigger events the vehicle may not revert to the state that the driver intended.

Figure 3:
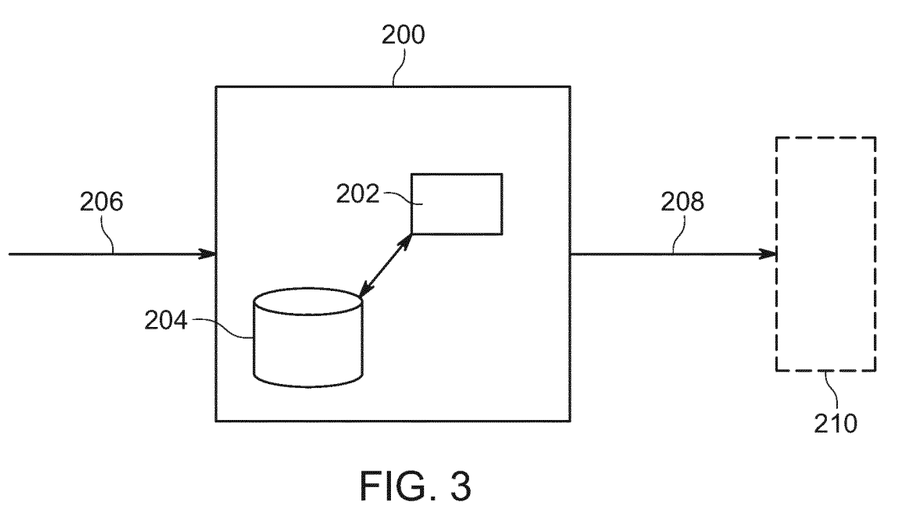
FIG. 3 is a controller for a vehicle system in accordance with an embodiment of the present invention.

FIG. 3 shows a controller for a vehicle system in accordance with an embodiment of the present invention. The controller 200 comprises a processor 202 and memory module 204. The controller 200 comprises an input 206 for receiving configuration signals and an output 208 for sending control signals to a vehicle system 210.

It is noted that the memory module may comprise any suitable mechanism for storing information, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM and EEPROM); flash memory; or electrical or other types of medium for storing such information/instructions. The memory module (204) is arranged to store one or more specified action to be carried out by vehicle systems. These vehicle systems comprise at least one of: EV charging system; navigation system; HVAC or comfort system; entertainment or infotainment system; interior configuration such as seat position control; vehicle security system; vehicle camera control system; side mirror control system; tow-bar deployment/retraction control system; Advanced Driver Assistance Systems (ADAS); and/or telephone/media features.

Operation of the controller 200 of FIG. 3 is now described with reference to FIG. 4.

In step 220, the controller 200 receives (at input 206) a configuration signal specifying an action to be carried out by the vehicle system 210 in response to a trigger condition. It is noted that the configuration signal may be received from an in-vehicle interface (e.g. through a control system within the vehicle interior such as a touchscreen or switch/button array in combination with a screen) or from an external device (e.g. a suitably configured smart device such as a smartphone or from a computer). The trigger condition is associated with a start condition. The trigger condition may be one of more of: vehicle location; time; vehicle interior temperature or cabin temperature; and exterior or ambient temperature. Additionally, the trigger condition may be one of more of: vehicle interior humidity or cabin humidity; and exterior or ambient humidity. Additionally or alternatively, the trigger condition may comprise a time value and the start condition defines one of: a weekday; a weekend; a time of day; a length of driving period.

The action and associated trigger condition (also referred to herein as an action/trigger event) are stored in step 222 within the memory module 204.

In step 224, the processor 202 is arranged to determine when the start condition relating to the stored action/trigger event is met and then to generate a control signal to control the vehicle system 210. In step 226, the control signal is output (from the output 208) to the vehicle system 210.

The memory module 204 is additionally arranged to store a default action and default trigger condition. In step 228, the processor 202 is arranged to determine when the default trigger condition has been met and generate a further control signal and, in step 230, to output the further control signal for controlling the vehicle system in accordance with the stored default action.

Figure 5:
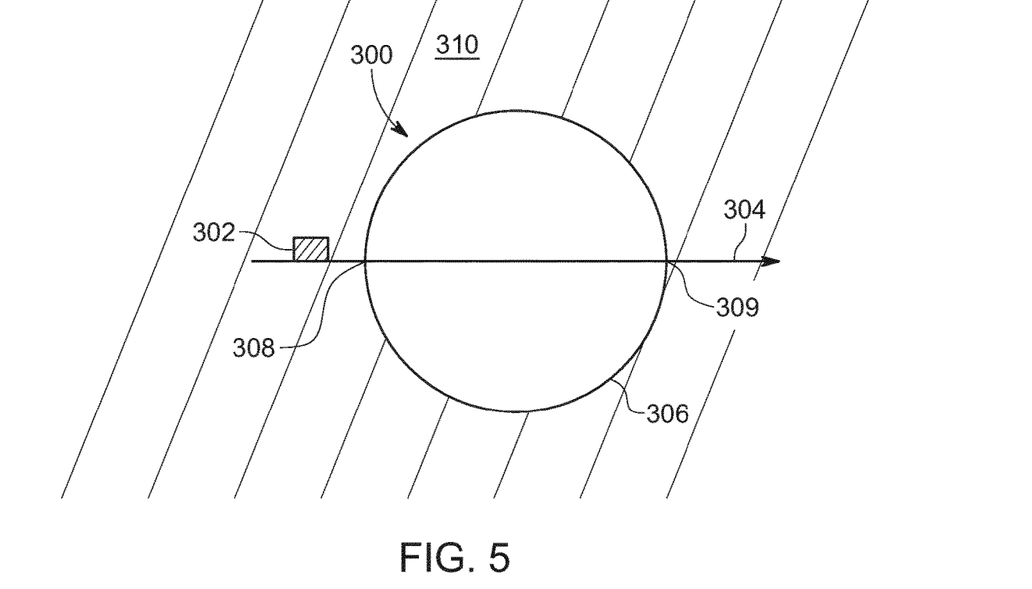
FIG. 5 is a representation of an action/trigger event in accordance with an embodiment of the present invention.

FIG. 5 shows an action/trigger event 300 for a vehicle system in accordance with an embodiment of the present invention. In FIG. 5, an action has been defined in relation to a location trigger condition. As shown in the figure, as a vehicle 302 traversing a route 304 reaches the location 306 defined by the driver, they enter the geofenced location "bubble" 306 at point 308. Entry into the location 306 corresponds to the start condition of the trigger condition for the defined action being met. The controller 200 within the vehicle therefore sends a control signal to the vehicle system 210 to perform the user defined action.

In addition to defining the action/trigger event 300, the process of managing an action/trigger event in accordance with embodiments of the present invention comprises setting/defining a default condition.

In the embodiment shown in FIG. 5 the default condition comprises a default location 310 which is associated with a default action for the vehicle system. As can be seen in FIG. 5, the default location is associated with all locations outside of location 306. Entry into the default location at point 309 effectively defines a default trigger condition which is associated with the default action for the vehicle system 210.

It can therefore been seen that as the vehicle 302 progresses further along the path 304 it will eventually leave location 306 and enter the default area 310. At the point of entry 309 into the default area 310, the default condition is triggered and the controller is arranged to generate a further control signal to control the vehicle system 210 in accordance with the default action.

Figure 4:
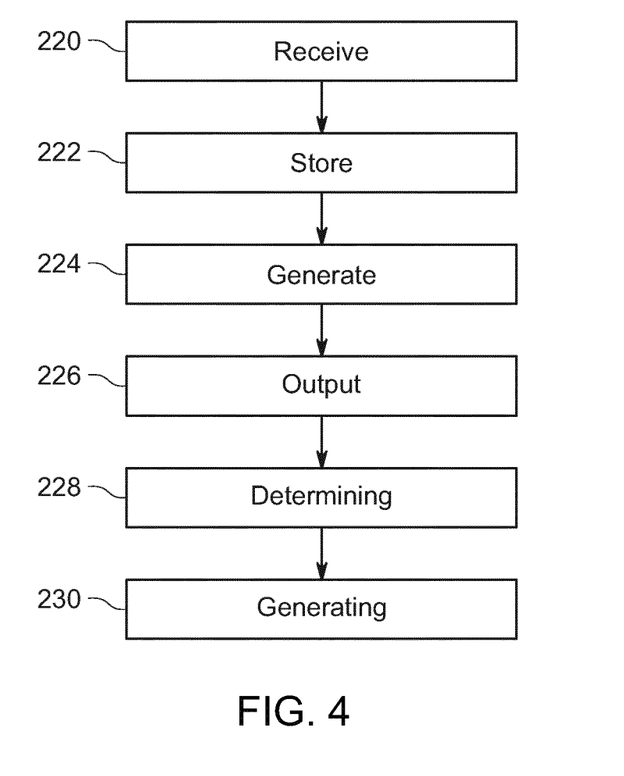
FIG. 4 is a method of controlling a vehicle system in accordance with an embodiment of the present invention.

The arrangement shown and described in relation to FIGS. 3 to 5 provides the advantage that the driver only needs to define start conditions for taking predefined actions. The requested action in FIG. 5 is taken as the vehicle 302 enters the location 306 and the default action is taken as the vehicle 302 enters the default location 310. It is not required to define entry and exit conditions as in FIGS. 1 and 2.

Figure 6:
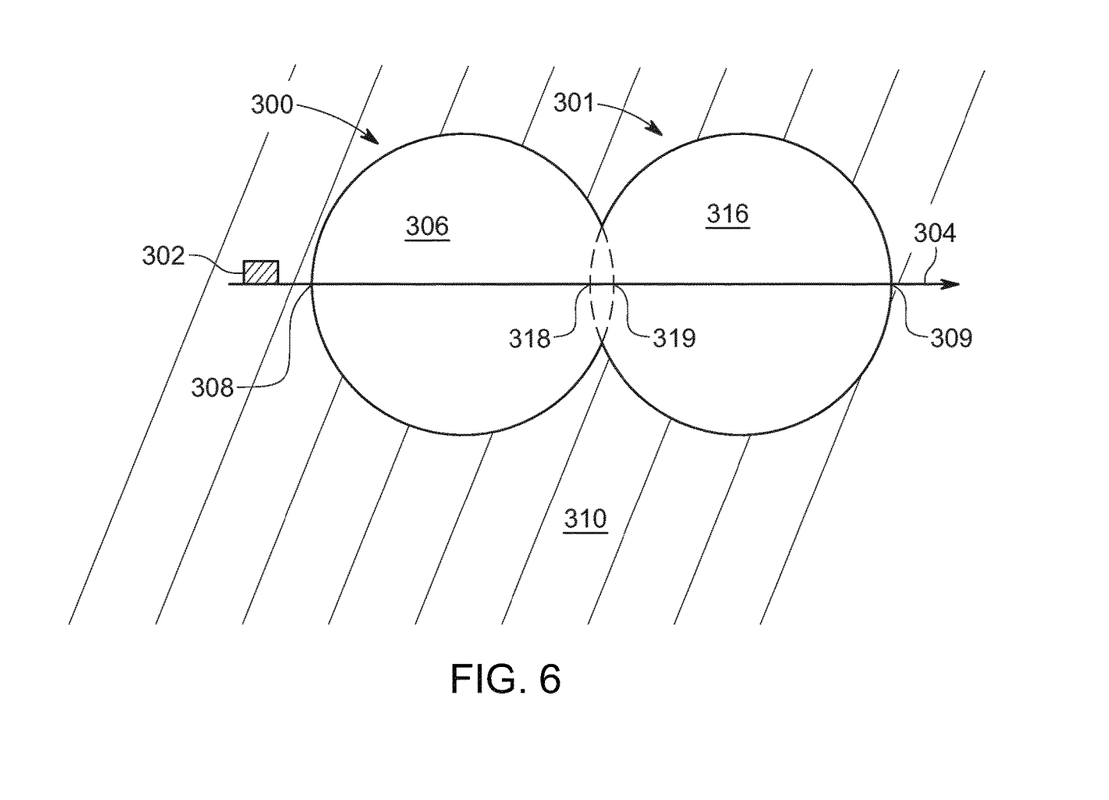
FIG. 6 is a representation of a pair of action/trigger events in accordance with an embodiment of the present invention.

FIG. 6 shows an embodiment of the present invention comprising two driver defined locations 306, 316. Each location is associated with the same action to be undertaken by the vehicle system 210. The default location is again indicated as 310.

As in FIG. 5, the vehicle is travelling along path 304 and is initially located in the default location 310. As the vehicle 302 enters the location 306 at point 308 the action associated with action/trigger event 300 is triggered. The controller 200 within the vehicle therefore sends a control signal to the vehicle system 210 to perform the defined action.

As the vehicle subsequently reaches the boundary of the second location 316 (at point 318) the trigger condition for the action/trigger event 301 associated with the second location 316 is triggered. As noted above, each location (306, 316) is associated with the same action to be undertaken by the vehicle system 210 and so the controller 200 will maintain its control of the vehicle system 210.

As the vehicle continues its journey along route 304 it leaves location 306 at point 319. In contrast to the arrangement shown in FIG. 2 however there are no exit conditions associated with the action/trigger events 300, 301 and so the control signal sent to the vehicle system 210 is not deactivated as the vehicle exits location 306.

Finally in the scenario shown in FIG. 6 the vehicle 302 re-enters the default area 310 at point 309 thereby triggering the default action in relation to the vehicle system 210.

It is noted that the above described scenarios avoid the problem identified in FIG. 2 in which the vehicle controller 200 deactivates the vehicle system 210 as the vehicle exits the first location 306.

Although the above scenarios show a location based trigger condition for an action/trigger event it is noted that other trigger conditions could be used depending on the action required. For example, a trigger condition based on internal vehicle or external vehicle temperature could be used to control a vehicle system, such as an environmental system of the vehicle. A suitable environmental system would be a vehicle Heating Ventilation and Air Conditioning (HVAC) system or additionally or alternatively may be a heated glazing system or demister. Additionally or alternatively, a trigger condition based on a time period could be used to control a vehicle system.

Figure 7:
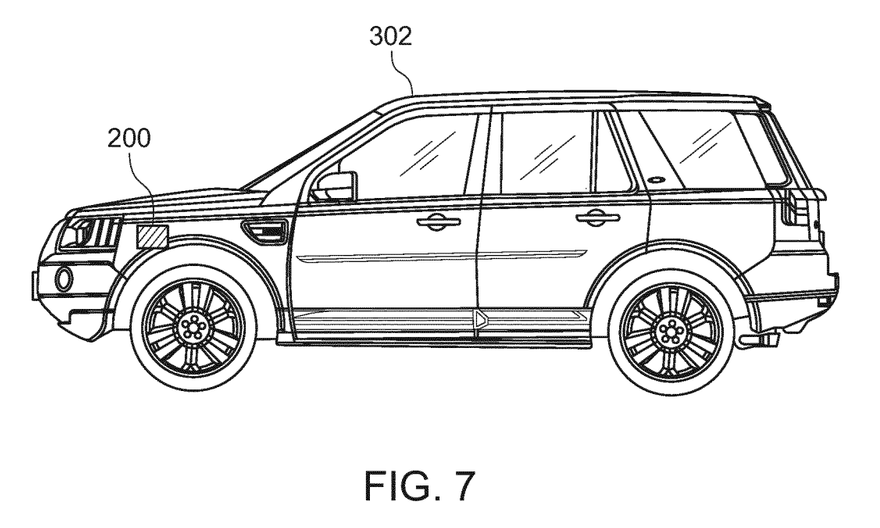
FIG. 7 is a vehicle in accordance with an embodiment of the present invention.

FIG. 7 shows a vehicle 302 comprising a controller 200 in accordance with embodiments of the present invention.

Many modifications may be made to the above examples without departing from the scope of the present invention as defined in the accompanying claims.

The invention claimed is:

1. A controller for controlling a vehicle system, the controller comprising:
an input for receiving a configuration signal specifying a user-defined action to be carried out by the vehicle system in response to a trigger condition, the trigger condition being associated with a start condition;
a memory module arranged to store data indicative of the specified action and trigger condition, the memory module being further arranged to store data indicative of a default action to be carried out by the vehicle system in response to a default action trigger condition;
a processor arranged, upon the start condition being met, to generate a control signal for controlling the vehicle system in accordance with the stored action; and
an output arranged to output the control signal;
wherein the processor is arranged to determine when, subsequent to the start condition being met, a default action trigger condition is met and to generate a further control signal for controlling the vehicle system in accordance with the stored default action.

2. A controller as claimed in claim 1, wherein the trigger condition defines a geofenced location and the start condition defines entry into the defined location.

3. A controller as claimed in claim 2, wherein the default action trigger condition defines a default area outside the defined geofenced location.

4. A controller as claimed in claim 2, wherein the memory module is further arranged to store data defining a plurality of overlapping geofenced areas, each geofenced area being associated with the same specified action, wherein the processor is further arranged upon entry into one of the plurality of geofenced areas to generate a control signal for controlling the vehicle system in accordance with the stored action and to generate a control signal for controlling the vehicle system in accordance with the default action as the vehicle enters into the defined default area.

5. A controller as claimed in claim 2, wherein the memory module is further arranged to store data defining a plurality of overlapping geofenced areas, each geofenced area being associated with the same specified action, wherein the processor is further arranged to merge the overlapping geofenced areas into a single geofenced zone and wherein upon entry into the geofenced zone the processor is arranged to generate a control signal for controlling the vehicle system in accordance with the stored action and to generate a control signal for controlling the vehicle system in accordance with the default action as the vehicle enters into the defined default area.

6. A controller as claimed in claim 1, wherein the trigger condition comprises a temperature value and the start condition defines one of: exceeding a threshold temperature value; falling below a threshold temperature value; entering a temperature range.

7. A controller as claimed in claim 6, wherein the memory module is further arranged to store data indicative of overlapping temperature ranges relating to in-vehicle and/or external temperature values.

8. A controller as claimed in claim 1, wherein the trigger condition comprises a time value and the start condition defines one selected from the group consisting of: a weekday; a weekend; a time of day; and a length of driving period.

9. A controller as claimed in claim 8, wherein the memory module is further arranged to store data indicative of overlapping time periods.

10. A vehicle comprising the controller according to claim 1.

11. A method of controlling a vehicle system, the method comprising:
receiving a configuration signal specifying a user-defined action to be carried out by the vehicle system in response to a trigger condition, the trigger condition being associated with a start condition;
storing in a memory module data indicative of the specified action and trigger condition, the memory module being further arranged to store data indicative of a default action to be carried out by the vehicle system in response to a default action trigger condition;
generating, upon the start condition being met, a control signal for controlling the vehicle system in accordance with the stored action;
outputting the control signal; and
determining when, subsequent to the start condition being met, a default action trigger condition is met and generating a further control signal for controlling the vehicle system in accordance with the stored default action.

12. A method as claimed in claim 11, wherein the trigger condition defines a geofenced location and the start condition defines entry into the defined location.

13. A method as claimed in claim 12, wherein the default action trigger condition defines a default area outside the defined geofenced location.

14. A method as claimed in claim 12, further comprising storing in the memory module data indicative of a plurality of overlapping geofenced areas, each geofenced area being associated with the same specified action, wherein the method comprises generating a control signal for controlling the vehicle system in accordance with the stored action upon entry into one of the plurality of geofenced areas, and generating a control signal for controlling the vehicle system in accordance with the default action upon entry into the default area.

15. A method as claimed in claim 12, further comprising storing in the memory module data indicative of a plurality of overlapping geofenced areas, each geofenced area being associated with the same specified action, wherein the method comprises merging the overlapping geofenced areas into a single geofenced zone, generating a control signal for controlling the vehicle system in accordance with the stored action upon entry into the geofenced, and generating a control signal for controlling the vehicle system in accordance with the default action as the vehicle enters into the defined default area.

16. A method as claimed claim 11, wherein the trigger condition comprises a temperature value and the start condition defines one selected from the group consisting of: exceeding a threshold temperature value; falling below a threshold temperature value; and entering a temperature range.

17. A method as claimed in claim 16, further comprising storing in the memory module data indicative of overlapping temperature ranges relating to in-vehicle and/or external temperature values.

18. A method as claimed claim 11, wherein the trigger condition comprises a time value and the start condition defines one selected from the group consisting of: a weekday; a weekend; a time of day; and a length of driving period.

19. A method as claimed in claim 18, further comprising storing data indicative of overlapping time periods in the memory module.

20. A non-transitory computer-readable storage medium comprising instructions which, when executed by a computer, cause the computer to carry out the method of claim 11.

* * * * *